(12) United States Patent
Accapadi et al.

(10) Patent No.: US 8,973,007 B1
(45) Date of Patent: *Mar. 3, 2015

(54) ADAPTIVE LOCK LIST SEARCHING OF WAITING THREADS

(71) Applicant: International Business Machines Corporation, Armonk, NY (US)

(72) Inventors: Mathew Accapadi, Cedar Park, TX (US); Grover C. Davidson, II, Round Rock, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,087

(22) Filed: Dec. 9, 2013

Related U.S. Application Data

(63) Continuation of application No. 14/076,223, filed on Nov. 10, 2013.

(51) Int. Cl.
*G06F 9/46* (2006.01)
*G06F 9/52* (2006.01)

(52) U.S. Cl.
CPC ........................................ *G06F 9/52* (2013.01)
USPC ........................................................ 718/102

(58) Field of Classification Search
CPC .............................. G06F 9/4881; G06F 9/4843
USPC ........................................................ 718/102
See application file for complete search history.

(56) References Cited

U.S. PATENT DOCUMENTS

| 4,918,595 | A | * | 4/1990 | Kahn et al. | 718/102 |
|---|---|---|---|---|---|
| 6,678,772 | B2 | | 1/2004 | McKenney | |
| 7,992,150 | B2 | | 8/2011 | Brenner | |
| 8,020,166 | B2 | | 9/2011 | Ruemmler | |
| 8,131,983 | B2 | | 3/2012 | Babich | |
| 2004/0117791 | A1 | * | 6/2004 | Prasad et al. | 718/100 |
| 2006/0130062 | A1 | | 6/2006 | Burdick et al. | |
| 2008/0086731 | A1 | * | 4/2008 | Trossman et al. | 718/100 |
| 2008/0244209 | A1 | * | 10/2008 | Seelam et al. | 711/168 |
| 2010/0250809 | A1 | | 9/2010 | Ramesh et al. | |
| 2012/0076152 | A1 | * | 3/2012 | Mansharamani | 370/413 |

* cited by examiner

*Primary Examiner* — Emerson Puente
*Assistant Examiner* — Steven Do
(74) *Attorney, Agent, or Firm* — James L. Baudino

(57) ABSTRACT

According to one aspect of the present disclosure, a method and technique for adaptive lock list searching of waiting threads includes determining an average service time for a lock associated with a shared computing resource; determining an average search time for selecting a thread to next receive the lock from a plurality of threads waiting for the lock; summing the average service time and the average search time; applying a search factor to the summed average service time and average search time to obtain a target search time for searching the waiting threads for selecting the next thread for obtaining the lock; determining a quantity of waiting threads to consider for next obtaining the lock based on the target search time and the average search time, the quantity being less than a total quantity of waiting threads; and identifying the next thread to obtain the lock from the quantity.

7 Claims, 4 Drawing Sheets

ADAPTIVE LOCK LIST SEARCHING OF WAITING THREADS

BACKGROUND

In a computing system, multiple requesters (e.g., software threads, processors, or other hardware) may contend for access to a shared object or resource such as, for example, a critical section in a memory, a shared data structure, a semaphore, or other suitable shared resources. An arbitration scheme is typically used so that only one requester can access the shared resource at a time. The arbitration scheme uses a lock that is associated with the shared resource so that the other requesters will be blocked from accessing the shared resource until the current requester has completed its operation in the shared resource and has released the lock.

BRIEF SUMMARY

According to one aspect of the present disclosure a method and technique for adaptive lock list searching of waiting threads is disclosed. The method includes determining an average service time for a lock associated with a shared computing resource; determining an average search time for selecting a thread to next receive the lock from a plurality of threads waiting for the lock; summing the average service time and the average search time; applying a search factor to the summed average service time and average search time to obtain a target search time for searching the waiting threads for selecting the next thread for obtaining the lock; determining a quantity of waiting threads to consider for next obtaining the lock based on the target search time and the average search time, the quantity being less than a total quantity of waiting threads; and identifying the next thread to obtain the lock from the quantity.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
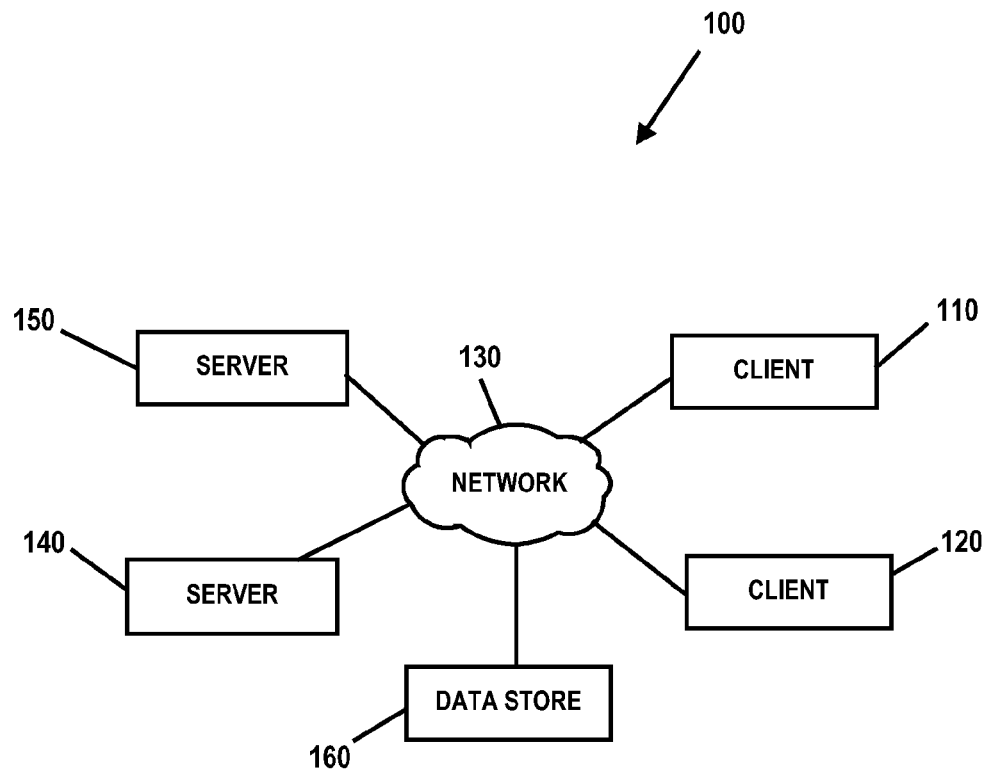
FIG. 1 is an embodiment of a network of data processing systems in which the illustrative embodiments of the present disclosure may be implemented.

Embodiments of the present disclosure provide a method, system and computer program product for adaptive lock list searching of waiting threads. For example, in some embodiments, the method and technique includes determining an average service time for a lock associated with a shared computing resource; determining an average search time for selecting a thread to next receive the lock from a plurality of threads waiting for the lock; summing the average service time and the average search time; applying a search factor to the summed average service time and average search time to obtain a target search time for searching the waiting threads for selecting the next thread for obtaining the lock; determining a quantity of waiting threads to consider for next obtaining the lock based on the target search time and the average search time, the quantity being less than a total quantity of waiting threads; and identifying the next thread to obtain the lock from the quantity. Embodiments of the present disclosure provide a dynamic approach to searching a waiter list of threads for next obtaining a lock that evaluates the characteristics associated with the lock for limiting the amount of time spent searching/scanning entries of the waiter list. Embodiments of the present disclosure use a target search time and/or otherwise determine a quantity of waiters to search from the waiter list based on historical search and wake times for waiting threads and historical lock/unlock times to adapt to current lock behavior and characteristics. Thus, according to embodiments of the present disclosure, instead of evaluating every entry in the waiter list, an upper bound/limit is set on the searching time or number of waiter list entries to search for next obtaining the lock based on lock behavior.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
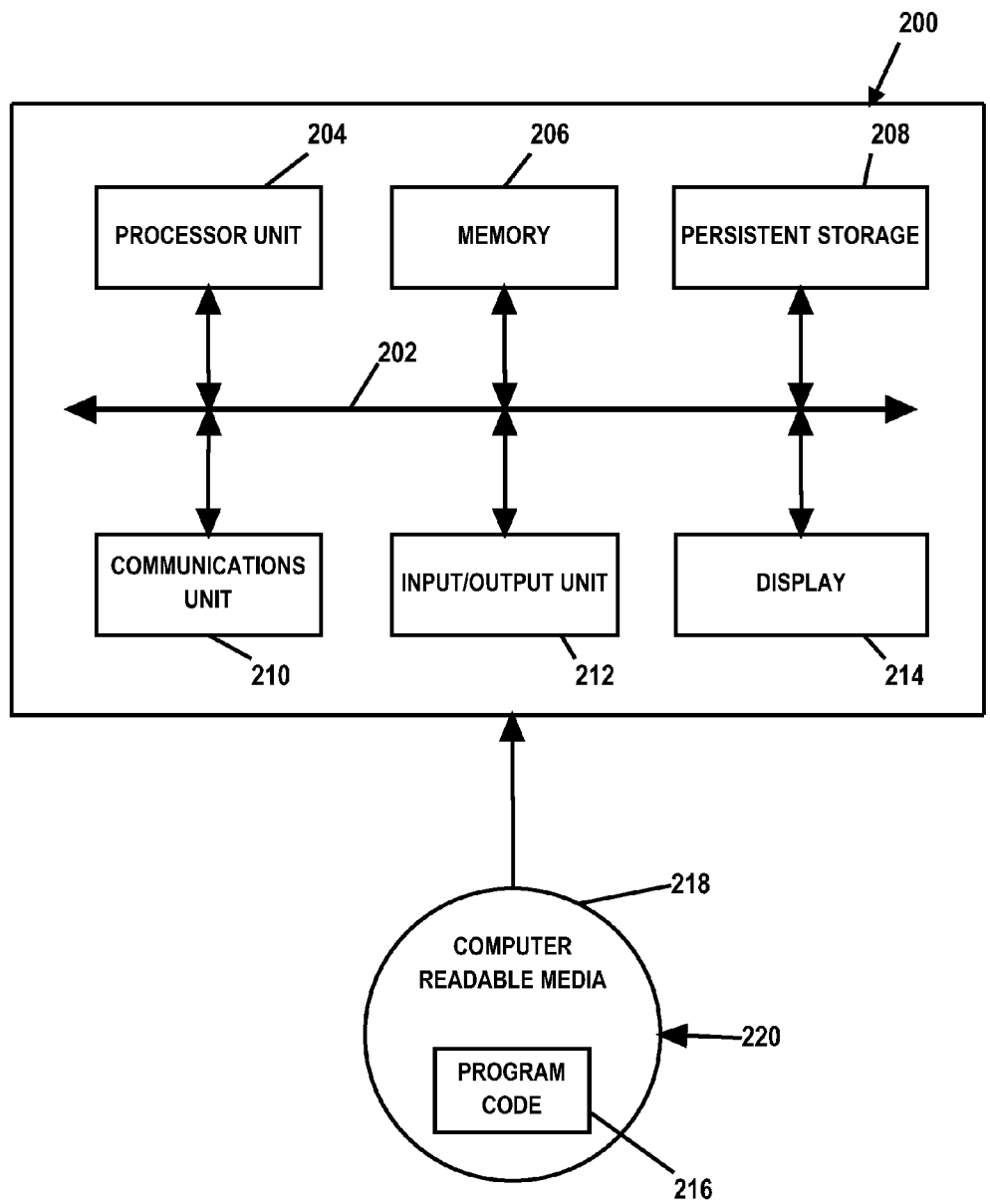
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for adaptive lock list searching of waiting threads according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters.

Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
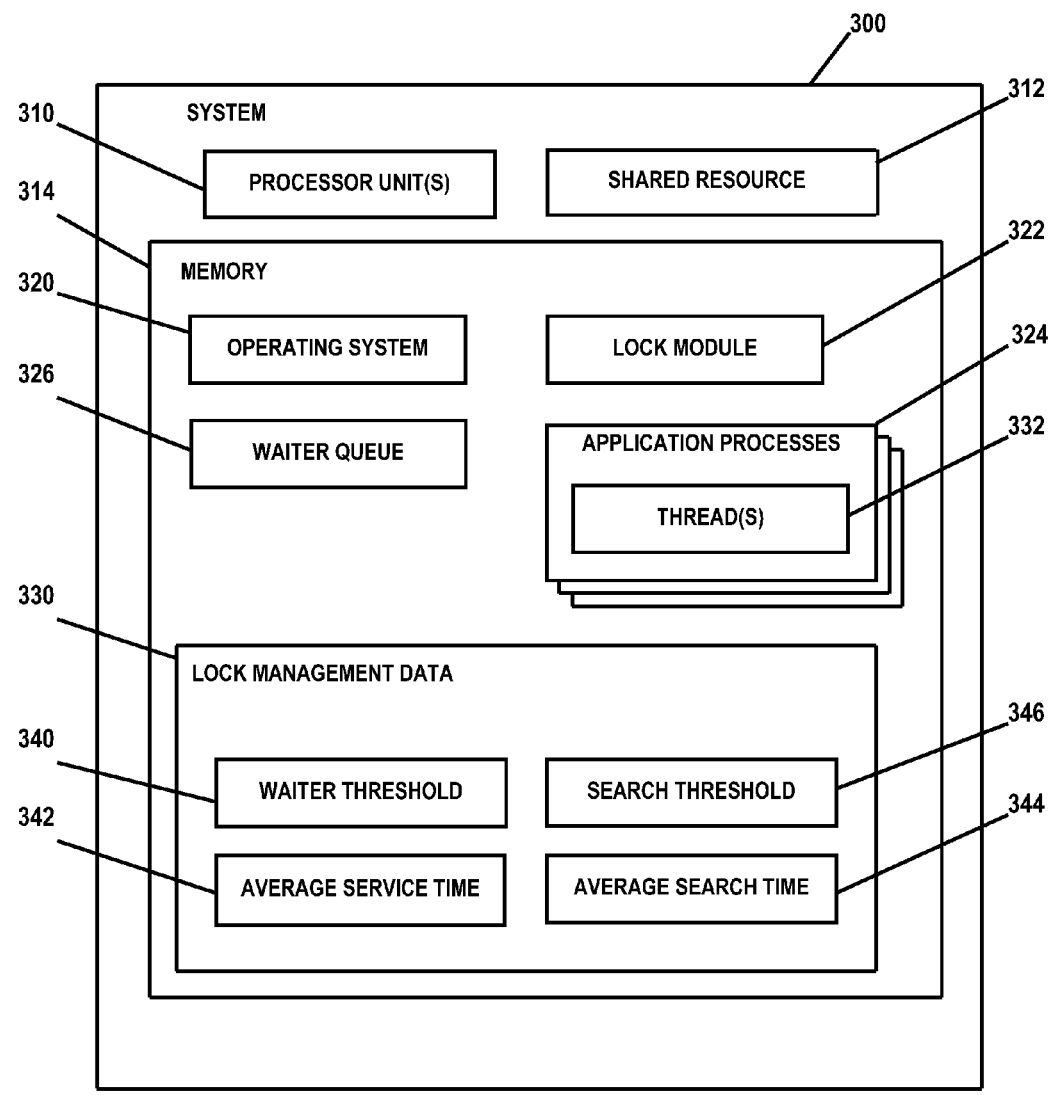
FIG. 3 is a diagram illustrating an embodiment of a data processing system for adaptive lock list searching in which illustrative embodiments of the present disclosure may be implemented.

FIG. 3 is an illustrative embodiment of a system 300 for adaptive lock list searching of waiting threads according to the present disclosure. System 300 may be implemented on data processing systems or platforms such as, but not limited to, servers 140 and/or 150, clients 110 and/or 120, or at other data processing system locations. In the embodiment illustrated in FIG. 3, system 300 comprises one or more processor units 310, a shared resource or object 312, and a memory 314. Memory 314 may include an operating system 320, a lock module 322, one or more application processes 324, a waiter list or queue 326 and lock management data 330. A lock is associated with shared resource 312 such as, but not limited to, a critical section in a memory, a shared data structure, or other types of computing system resources. A lock may be a bit value (a logical "1" or logical "0") that is set in a memory location of the shared resource 312 or may be another type of lock mechanism. For example, a particular software thread 322 of an application process may set the bit value in the lock when the thread 322 has ownership of the lock. A thread 322 may be a stream of instructions that are being executed by processor unit 310. The thread 312 can access or perform operations in the shared resource 312 when the thread 332 has ownership of the lock that is associated with the shared resource 312. When one thread 332 has ownership of the lock, other threads 332 will not have ownership of the lock and, therefore, these other threads 332 will not be able to access and will not be able to perform operations on the shared resource 312.

Lock module 322 evaluates and/or otherwise uses various information associated with a particular lock to determine a number of waiting threads 332 to be searched/considered to select a next thread for obtaining the lock. For example, lock module 322 may evaluate various types of information associated with the lock, the number of threads 332 waiting for the lock, etc., to set an upper bound/limit of the number of waiting threads to search/consider before selecting the next thread to obtain the lock (i.e., some quantity less than the total quantity of waiting threads). Lock module 322 may be implemented in any suitable manner using known techniques that may be hardware-based, software-based, or some combination of both. For example, lock module 322 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the illustrated embodiment, waiter queue 326 is illustrated as a queue for waiting threads 322 (i.e., threads waiting for the lock to access and perform operations on the shared resource 312). Although a queue is depicted in FIG. 3, it should be understood that a queue need not be used for waiting threads 332 (i.e., waiting threads need 322 not be placed in a queue; waiting threads 322 may be included in a waiter list and/or be otherwise be tracked, identified and/or scheduled, etc.).

In embodiments of the present disclosure, lock module 322 is configured to adaptively search and/or select threads 322 waiting for a lock to minimize overhead associated with a lock and search and/or select threads 322 waiting for the lock based on performance measures associated with the lock. For example, in the illustrated embodiment, lock management data 330 includes a waiter threshold 340, average lock service time values 342, average waiter thread search time values 344 and a search threshold 346. In some embodiments, waiter threshold 340 may be a threshold associated with a quantity of threads 332 waiting for a particular lock. Waiter threshold 340 may be set by a user/administrator, based on a value derived/tuned over time, or dynamically derived/set for the particular lock based on performance characteristics associated with the lock. As will be described in greater detail below, certain functions and/or processes may be initiated and/or taken in response to a quantity of waiting threads 332 meeting and/or exceeding waiter threshold 340.

Average service time 342 may comprise a computed average time for a particular lock between when a thread 332 takes/obtains a lock and a time when the thread 332 releases the lock. Average search time 344 may comprise an average amount of time taken to search and/or evaluate threads 332 waiting for the lock to select the next thread 332 for obtaining the lock. For example, threads 332 waiting for the lock may have different priorities, locality differences relative to the shared resource 312, etc., such that certain waiting threads 332 may be selected over other waiting threads 332 based on some criteria. Lock management data 330 may also include an average time for waking a waiting thread 332. In the illustrated embodiment, average search time 344 includes an average time taken to search waiting threads 332 to select a next thread 332 to obtain the lock and the average amount of time taken to wake threads 332 selected to next receive the lock. However, it should be understood that the average amount of time for waking a waiting thread may be part of average service time 342 or may be separate calculated/computed component.

Search threshold 346 may comprise a value (or percentage/factor applied to a quantity/time/etc.) to designate a quantity of threads 332 waiting for the lock to search for selecting the next waiting thread 332 to obtain the lock. For example, search threshold may comprise a value/factor (e.g., 25%) applied to average service time 342, average search time 344, waiter threshold 340, or some combination thereof) to set and/or limit the quantity of waiting threads to search before selecting a next thread for obtaining the lock. Thus, search threshold 346 is used to limit the search of waiting threads to obtain the lock to some quantity less than the total quantity of threads waiting for the lock (e.g., setting an upper bound on a number of waiting threads to search/consider before selecting a next thread to obtain the lock). Threshold 346 may be statically set (e.g., by a user/administrator) or dynamically set (e.g., based on the number of waiting threads, the service/search times associated with the lock, etc.).

Thus, in some embodiments, processes and/or actions taken by lock module 322 may be initiated and/or triggered when a quantity of waiting threads 332 (e.g., threads 332 in a waiter list waiting or residing in waiter queue 326) reaches and/or exceeds waiter threshold 340. For example if waiter threshold 340 is set at fifty, lock module 322 may begin measuring and/or evaluating average service time 342 and average search time 344 for a particular lock to determine performance characteristics associated with the particular lock. In some embodiments, average service time 342 and average search time 344 may be determined by recording timestamps for a series of operations. For example, a kernel function associated with waking up a thread records the time at the beginning of the wakeup. A flag may be set that the thread waking up is to record the time that a lock is released minus the time associated with the beginning of the wakeup. Time stamps may also be recorded associated with when a thread obtains a lock and when the thread releases the lock, along with timestamps associated with time spent evaluating/searching each thread in the waiter list. It should be understood that other methods may also be used to obtain the average service time 342 and the average search time 344.

In some embodiments, the average time to be used for computing average service time 342 and/or average search time 344 may be based on the last few samples of timestamp and/or average values. For example, in some embodiments, timestamps may be recorded on an ongoing basis, as well as average computations, according to some sampling schedule or otherwise. However, in response to the number of waiting threads reaching threshold 340, lock module 322 may take a recent last few/quantity of values to compute average service time 342 and/or average search time 344. Thus, in some embodiments, new or recent values may replace older timestamp and/or average values.

Lock module 322 uses average service time 342 and average search time 344 to determine a target search time for searching entries of the waiter list/queue 326 for selecting a next thread to obtain the lock (e.g., setting an upper bound/limit on an amount of time to search the waiter list). In some embodiments, a sum of the average service time 342 and average search time 244 is used to determine an average amount of time for lock servicing and searching entries of the waiter list (which includes the amount of time to wake a thread on the waiter list). As an example, consider a sample size of three with the following summed service times and search times (individual times as opposed to averages)

1) four microseconds;
2) six microseconds; and
3) two microseconds.

The average time for lock service and search is four microseconds. Also, presume 0.1 microseconds for each entry of the waiter list searched, and presume a search threshold/factor 346 of 25%. In this example, lock module 322 would apply the threshold/factor 346 of 25% to the summed average service and search time (25% of four microseconds=one microsecond) to obtain an upper target time limit for searching entries of the waiter list for selecting the next thread for obtaining the lock. In this example, since the target search time limit is one microsecond, and since it takes 0.1 microsecond to search each entry of the waiter list, lock module 322 would search/scan no more than ten entries/threads of the waiter list to find the best candidate for next obtaining the lock (even though a greater number of threads are on the waiter list). It should be understood that the "averages" computation may be computed a number of different ways (e.g., average service times and average search times summed; service times and search times summed then divided by the number of records; etc.).

In some embodiments, lock module 322 may be configured to determine and/or apply threshold 346 in response to a number of waiting threads reaching threshold 340. For example, in some embodiments, although average service time 342 and/or average search time 342 values (or timestamp values relative thereto) may be recorded and/or calculated, lock module 322 may not apply threshold 346 to limit the number of entries of the waiter threads to search until the number of waiting threads reaches threshold 340. In response to the waiting threads reaching threshold 340, lock module 322 may compute and/or otherwise determine threshold 346 for setting the upper bound of entries of the waiting list to search.

Thus, embodiments of the present disclose enable a dynamic approach to searching a waiter list of threads for next obtaining a lock that evaluates the characteristics associated with the lock for limiting the amount of time spent searching/scanning entries of the waiter list. For example, when a lock is held in an exclusive mode, a list of waiters queue up to be released one at a time when the unlock operation occurs. The time to process each service of the lock involves the time to do actual processing under the lock (e.g. the time between taking and releasing the lock) plus the time to search/select the next waiter to wake up and the time to get that waiter dispatched. The time to search/select the next waiter is typically the time to find the best candidate to wake up. When the list of waiters becomes long, the search/selection time to find the next candidate for the lock to wake up becomes the dominant factor in the total service time for the lock. Thus, embodiments of the present disclosure evaluate characteristics associated with the lock, as well as the number of waiters, to determine how long to search/scan (or the number of threads to scan/search) the waiter list for selecting the next thread to obtain the lock (as opposed to evaluating each thread on the waiter list).

Figure 4:
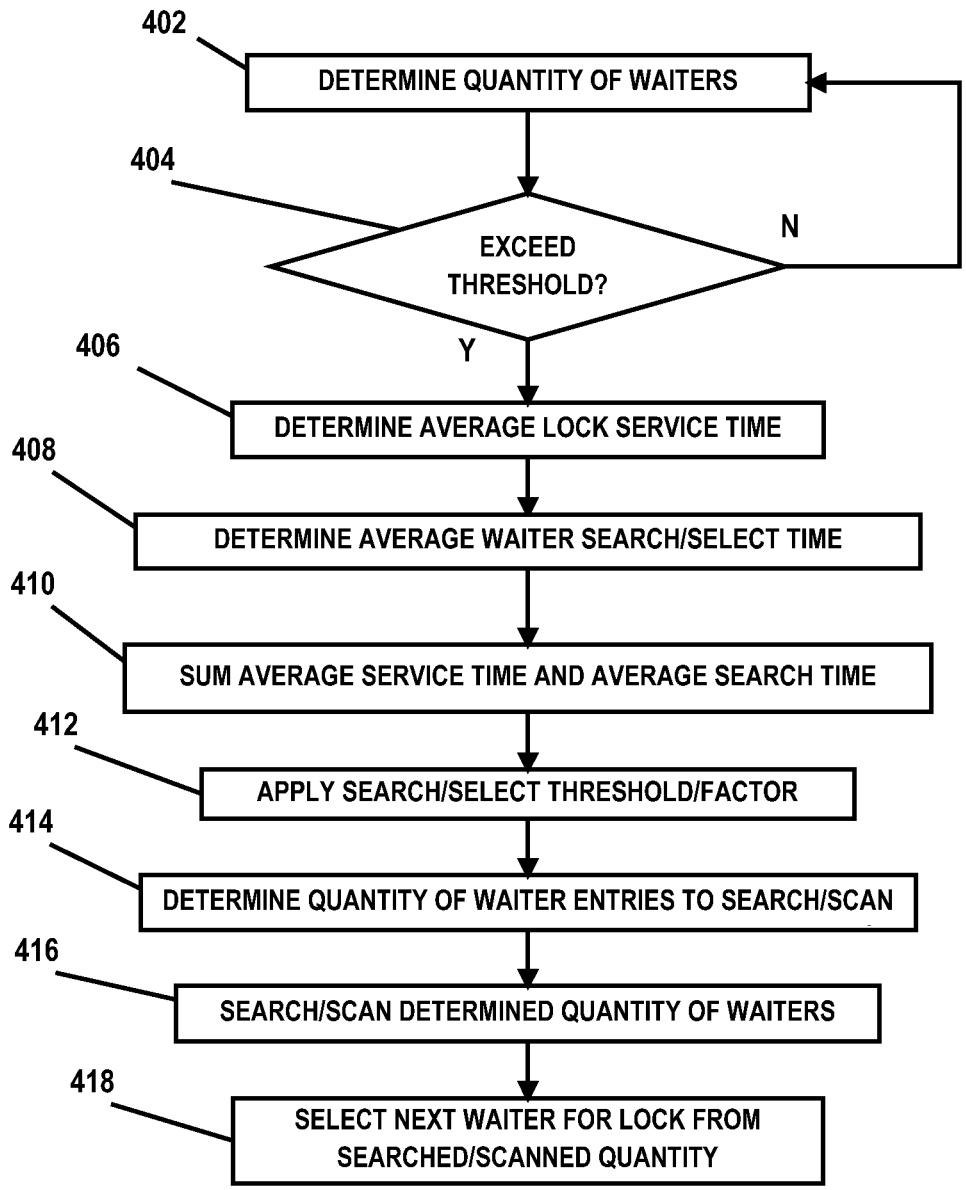
FIG. 4 is a flow diagram illustrating an embodiment of a method for adaptive lock list searching according to the present disclosure.

FIG. 4 is a flow diagram illustrating an embodiment of a method for adaptive lock list searching of waiting threads according to the present disclosure. The method begins at block 402, where lock module 322 determines a quantity of waiters or waiting threads for a particular lock. At block 404, a determination is made whether the quantity of waiters meets or exceeds threshold 340. If not, the method proceeds to evaluate the number of waiters against threshold 340. If the number of waters has met or exceeded threshold 340, the method proceeds to block 406, where lock module 322 determines the average lock service time for the particular lock. At block 408, lock module 322 determines the average waiter search/select time for the particular lock. At block 410, lock module 322 sums the average service time and average search time for the particular lock to determine the average time between lock/unlock plus the time for searching/evaluating waiting threads and waking up a selected thread for the next lock.

At block 412, lock module 322 applies a search/select threshold/factor to the summed average service time and the average search time. At block 414, lock module 322 determines a quantity of waiter entries to search/scan for selecting a next threads for obtaining the lock. At block 416, lock module 322 searches/scans the determined quantity of waiters. At block 418, lock module 322 selects a next waiter for obtaining the lock from the searched/scanned quantity of waiter list entries.

Thus, embodiments of the present disclosure enable a dynamic approach to searching a waiter list of threads for next obtaining a lock that evaluates the characteristics associated with the lock for limiting the amount of time spent searching/scanning entries of the waiter list. Embodiments of the present disclosure use a target search time and/or otherwise determine a quantity of waiters to search from the waiter list based on historical search and wake times for waiting threads and historical lock/unlock times to adapt to current lock behavior and characteristics. Thus, embodiments of the present disclosure, instead of evaluating every entry in the waiter list, set an upper bound/limit on the searching time or number of waiter list entries to search for next obtaining the lock based on lock behavior.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
determining an average service time for a lock associated with a shared computing resource;
determining an average search time for selecting a thread to next receive the lock from a plurality of threads waiting for the lock;
summing the average service time and the average search time;
applying a search factor to the summed average service time and average search time to obtain a target search time for searching the waiting threads for selecting the next thread for obtaining the lock;
determining a quantity of waiting threads to consider for next obtaining the lock based on the target search time and the average search time, the quantity being less than a total quantity of waiting threads; and
identifying the next thread to obtain the lock from the quantity.

2. The method of claim 1, further comprising determining the average service time and the average search time in response to the total quantity of waiting threads reaching a threshold.

3. The method of claim 2, further comprising dynamically determining the threshold based on the average search time.

4. The method of claim 2, further comprising dynamically determining the threshold based on the average service time.

5. The method of claim 1, further comprising determining the quantity of waiting threads to consider for next obtaining the lock in response to the total quantity of waiting threads reaching a threshold.

6. The method of claim 5, further comprising dynamically determining the threshold based on the average search time.

7. The method of claim 5, further comprising dynamically determining the threshold based on the average service time.

* * * * *